US 6,712,268 B1

(12) United States Patent
Mason et al.

(10) Patent No.: US 6,712,268 B1
(45) Date of Patent: Mar. 30, 2004

(54) METHOD FOR PREVENTING STORAGE OF DUPLICATE BARCODE ENTRIES IN AN ITEM SECURITY DATABASE

(75) Inventors: Timothy E. Mason, Buford, GA (US); Antonio R. Bogat, Duluth, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/185,457

(22) Filed: Jun. 27, 2002

(51) Int. Cl.[7] .............................................. G06K 15/00
(52) U.S. Cl. ........................................ 235/383; 235/380
(58) Field of Search ............................ 235/383, 462.13, 235/462.01, 462.08, 385, 462.14, 470, 485, 494

(56) References Cited

U.S. PATENT DOCUMENTS

| 5,361,871 | A | * | 11/1994 | Gupta et al. ................... 186/61 |
| 5,424,524 | A | * | 6/1995 | Ruppert et al. ................. 705/8 |
| 5,602,377 | A | * | 2/1997 | Beller et al. ............. 235/462.15 |
| 5,905,246 | A | * | 5/1999 | Fajkowski ................... 235/375 |
| 5,952,644 | A | * | 9/1999 | Barkan .................. 235/462.01 |
| 6,149,063 | A | * | 11/2000 | Reynolds et al. ...... 235/472.02 |
| 6,318,631 | B1 | * | 11/2001 | Halperin ...................... 235/383 |
| 6,446,869 | B1 | * | 9/2002 | Seevers et al. ......... 235/462.43 |
| 6,457,644 | B1 | * | 10/2002 | Collins et al. .......... 235/462.14 |
| 6,616,056 | B2 | * | 9/2003 | Cato ............................ 235/495 |

* cited by examiner

Primary Examiner—Thien M. Le
Assistant Examiner—Edwyn Labaze
(74) Attorney, Agent, or Firm—Maginot, Moore & Beck LLP

(57) ABSTRACT

A system, method and/or apparatus aids in preventing duplicate bar code entries in an item security database. Bar codes from items that vary with respect to a security characteristic such as a non-weight characteristic are compiled into a custom bar code format or template that is stored in a custom bar code format file. An obtained bar code from a scanned item is compared to the custom bar code format. If the obtained bar code compares to the custom bar code format, the bar code is manipulated according to the custom bar code format. The manipulated bar code is used to retrieve a security characteristic (value or data) regarding the scanned item and/or to create a bar code entry with an associated security characteristic if the bar code entry is not in the item security database.

22 Claims, 5 Drawing Sheets

US 6,712,268 B1

METHOD FOR PREVENTING STORAGE OF DUPLICATE BARCODE ENTRIES IN AN ITEM SECURITY DATABASE

FIELD OF THE INVENTION

The present invention relates generally to retail terminals that utilize bar codes and bar code databases and, more particularly, to retail terminals that utilize bar codes and item security databases.

BACKGROUND INFORMATION

Retail terminals such as checkout terminals utilize bar code technology to perform recognition of items and the determination of their price. This is accomplished by scanning an item's bar code and looking up a price corresponding to the scanned bar code in a price look-up table or database. The look-up table or database contains bar codes and prices for every item offered for sale in the store. Each bar code is associated with a price. Thus, once an item is scanned, the item's obtained bar code is correlated to the same bar code in the look-up table or database in order to determine the price of the item. The item's price is then returned to the retail terminal. The look-up table or database is typically maintained in a storage device that is remote from the retail terminal but in communication therewith via a network.

Retail checkout systems that allow a consumer to perform the checkout process without the aid of a clerk are in vogue. These types of retail checkout systems are typically termed unassisted or self-checkout systems. In the case of such unassisted or self-checkout systems, the scanned bar code is utilized to determine a non-price characteristic of the scanned item in addition to the price in order to alleviate fraud. This is accomplished in the same manner as price determination, i.e. the scanned item's bar code is used to look up a non-price characteristic of the item in an item security database or table.

Particularly, in such unassisted or self-checkout systems a characteristic, of a scanned item is used to verify that the item scanned correlates to what is placed in a bag. The item security database 24 maintains one or more item security characteristics and/or characteristic data correlated to a bar code.

A common item characteristic is weight. To verify weight, a bagging scale is typically provided under the bagging area such that items being bagged are automatically weighed by the scale. In order for this to be accomplished, the item security database contains a weight value or a weight database is maintained for all the merchandise in the store. In order to produce the weight database, the weight of each item must be entered into the database. In one form, the weight database is designed to learn weight of an item if a scanned bar code does not or is not correlated to a weight in the weight database. This is termed a weight learning database.

A problem common to databases but particularly with item security databases such as weight learning databases is that a bar code or Universal Product Code (UPC) may be implemented in a variety of formats. In one form, a UPC for a particular item has a fixed UPC. In another form, the UPC may have a supplemental portion in addition to the fixed UPC. Additionally, an item such as a periodical or magazine may include issue number or date in the UPC. Each week, month or the like, a new issue of the magazine is released. The UPC for the magazine thus changes accordingly. If the UPC is constantly changing, then each issue the system will not be able to use previous security characteristics/information (e.g. weight) for that item, since it would appear to the system to be a new item every time. The UPC scanner must be able to read the variety of formats. For various reasons, it is not desirable for a database to have duplicate entries. For example, duplicate entries unnecessarily enlarge a database. Further, duplicate entries may cause software conflicts. As such, duplication of database entries is necessarily avoided.

There is thus a possible problem and/or conflict with the variety of formats of UPCs regarding duplication of bar code entries with respect to an item specific security information in an item security database. Therefore, it would thus be desirable to be able to avoid such possible problem/conflict with duplication of bar code entries for an item with respect to item specific security information in an item security database.

It would also be desirable to avoid possible conflicts/problems when retrieving item security information from an item security database for an item having a variable, non-weight security characteristic.

It would further be desirable to avoid possible conflicts/problems when learning security information for an item security database for an item having a variable, non-weight security characteristic.

SUMMARY

The subject invention is system, apparatus and method that, in one form, aids in preventing/avoiding duplication of bar code entries in a database. Particularly, the system, apparatus and method aids in preventing/avoiding duplication of bar code entries in an item security database regarding an item having variable, non-weight security characteristics.

In one form, the subject invention provides a method of retrieving security data for an item from an item security database. The method includes the steps of: (a) scanning an item to obtain its bar code; (b) correlating the obtained bar code to a custom bar code format in a custom bar code format file; (c) manipulating the obtained bar code according to the correlated custom bar code format; and (d) using the manipulated bar code to retrieve security data for the scanned item from an item security database.

In another form, the subject invention provides a checkout system having a checkout terminal, a custom bar code file in communication with the checkout terminal and containing a custom bar code format, and an item security database in communication with the checkout terminal and containing a bar code entry for an item that varies with respect to a non-weight characteristic, and a security characteristic for the item corresponding to the bar code entry for that item. The checkout terminal has a processor, a scanner in communication with the processor, an item security characteristic data acquisition device in communication with the processor, and memory in communication with the processor and containing processor-executable program instructions. The processor-executable program instructions, when executed by the processor, causes the checkout terminal to (a) scan an item to obtain its bar code, (b) correlate the obtained bar code to the custom bar code format in the custom bar code format file, (c) manipulate the obtained bar code according to the correlated custom bar code format, and (d) use the manipulated bar code to retrieve security characteristic data for the item from the item security database by correlating the manipulated bar code with the bar code entry in the item security database.

In another form, the subject invention provides a method of preventing duplicate bar code entries in an item security database. The method includes the steps of (a) scanning an item to obtain its bar code, (b) correlating the obtained bar code to a custom bar code format in a custom bar code format file, (c) manipulating the obtained bar code according to the correlated custom bar code format, (d) acquiring security characteristic data of the scanned item, and (e) creating a manipulated bar code entry in an item security database correlated to the acquired security characteristic data of the scanned item.

BRIEF DESCRIPTION OF THE DRAWINGS

Corresponding reference characters indicate corresponding parts throughout the several views.

DETAILED DESCRIPTION OF THE INVENTION

Figure 1:
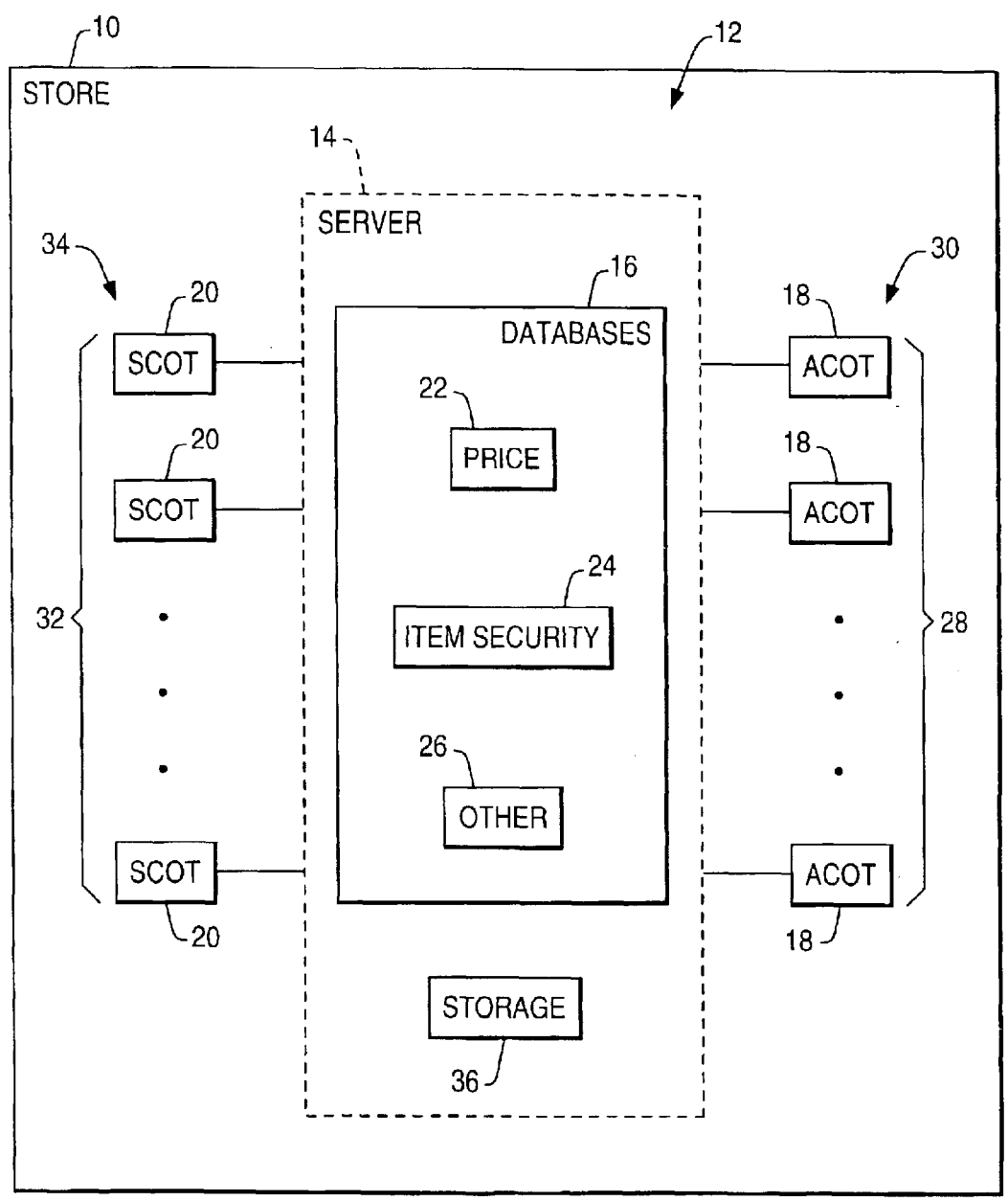
FIG. 1 is a block representation of a store with an exemplary embodiment of a checkout system in which the subject invention may be used.

Referring to FIG. 1, there is depicted a representation of a store or premises generally designated 10 in which the subject invention is and/or may be typically used. Without being limiting, the store 10 may be any type of store that sells, rents, and/or leases merchandise. Typically the store 10 is of the type that sells merchandise. One such type of store 10 is a grocery store. Without being limiting, the subject invention will be described herein in the context of a grocery store selling merchandise of any and all types.

The store 10 has a merchandise checkout system generally designated 12. The merchandise checkout system 12 is configured, adapted and/or operable to recognize an item being purchased and/or obtain information regarding the item being purchased, obtain a price for the item being purchased, obtain security characteristic data for the item being purchased and/or bagged, retrieve security characteristic data for the item being purchased and/or bagged, and compare the obtained security characteristic data of the item with the retrieved security characteristic data. The merchandise checkout system 12 is also configured, adapted and/or operable to learn security characteristic data of an item. Learning of one or more security characteristic of an item is particularly for storage in an item security database and/or look-up table such as that described below.

The merchandise checkout system 12 includes a server 14 that has a database 16, a plurality of assisted check-out terminals (ACOTs) 18 coupled to and/or in communication with the server 14 and/or the databases 16, and a plurality of self check-out terminals (SCOTs) 20 coupled to and/or in communication with the server 14 and/or the databases 16. The databases 16 include a price database 22, an item security database 24, and other databases 26. According to one form, the databases 16 may just include the item security database 24. According to another form, the databases 16 include the item security database 24 and one or more of the price database 32 and the other databases 26: As such, the merchandise system 12 may not necessarily include the server 14, but just one or more of the databases 16, 22, 24 and/or 26. While shown within the store 10, the server 14 and/or any one or more of the databases 16, 22, 24 and 26 may be remote from the store 10 and accessible via a network.

The plurality of ACOTs 18, the server 14 and/or the databases 16 or one or more individual database may be considered an assisted checkout system 28 with each individual ACOT 18 the server 14 and/or the databases 16 or one or more individual database considered an assisted checkout subsystem 30. It should be appreciated that the assisted checkout system 28 may comprise only one assisted checkout subsystem 30. In this case, the assisted checkout subsystem 30 comprises the assisted checkout system 28.

In like manner, the plurality of SCOTs 20, the server 14 and/or the databases 16 or one or more individual database may be considered a self-checkout system 32 with each individual SCOT 20, the server 14 and/or the databases 16 or one or more individual database considered a self-checkout subsystem 34. It should be appreciated that the self-checkout system 32 may comprise only one self-checkout subsystem 34. In this case, the self-checkout subsystem 34 comprises the self-checkout system 32.

In one form, the assisted checkout system 28 is coupled to and/or in communication with just the item security database 24 which may or may not be maintained within the server 14. As well, in one form, the self-checkout system 32 is coupled to and/or in communication with just the item security database 24 which may or may not be maintained within the server 14. In all cases, the item security database 24 is in communication with a checkout system via a network or the like.

While the subject invention is particularly suited for self-checkout systems, the subject invention may be equally utilized in assisted checkout systems 30 and/or a combination of self-checkout systems/assisted checkout systems 34/30. Without being limiting, the subject invention, however, will be described in terms of a self-checkout system 34.

Storage 36 may also be provided at the main server 14 that is accessible by the ACOT system 28 and the SCOT system 32. The storage 36 is configured, adapted and/or operable to store files such as a custom bar code format file, an option file and/or a configuration file or files in accordance with an aspect of the subject invention. Typically, such a file is in the form of a database, but may be any type of file that affords the functionality as described herein. The custom bar code format file stores one or more custom bar code formats. The storage 36 may also store program instructions for operation of the server 14, a SCOT 20 or ACOT 18, and/or any other component of the checkout system 12.

Figure 2:
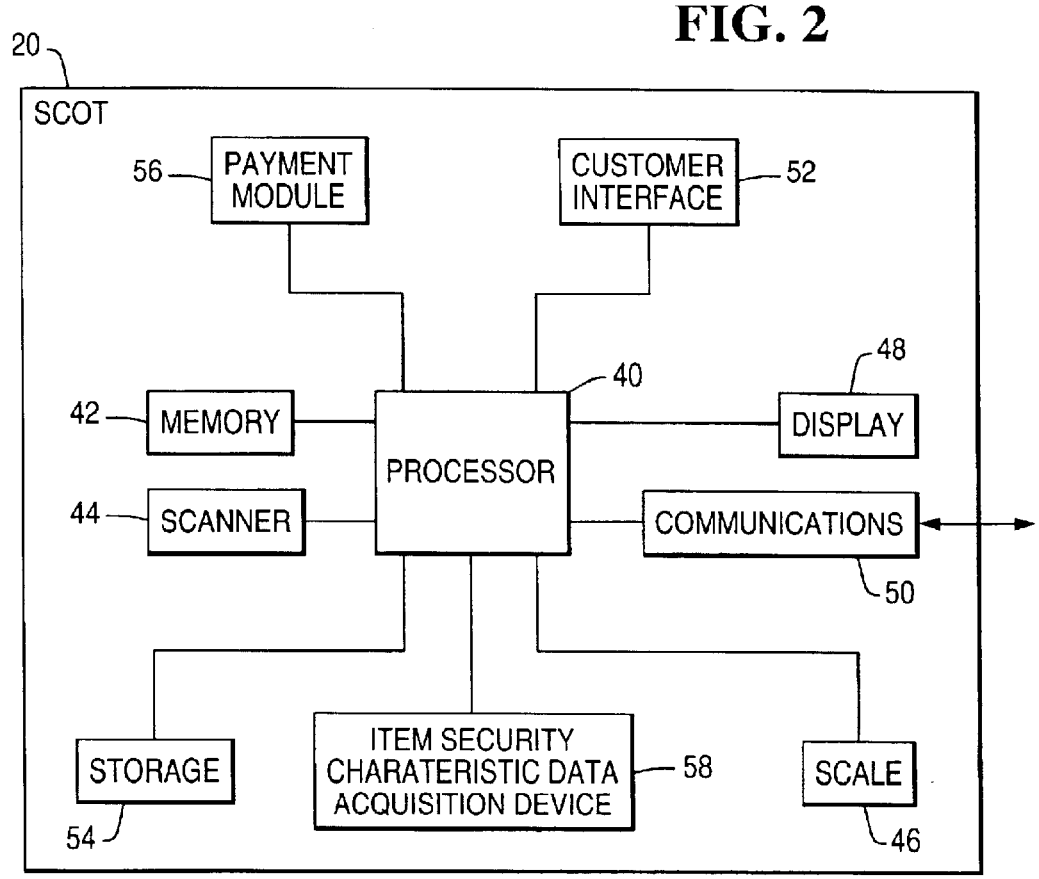
FIG. 2 is a block representation of an exemplary embodiment of a self-checkout terminal of the checkout system of FIG. 1 in which the subject invention may be used.

Referring to FIG. 2, there is depicted a block diagram of an exemplary SCOT 20 in and/or through which the subject invention may be implemented. The SCOT 20 includes a processor 40 that may be embodied as a microprocessor, processor circuitry/logic, processing means or the like. The processor also represents multiple processors and/or co-processors that may be used instead of a single processor. Memory 42 is also provided that may be embodied as RAM, ROM, EEPROM, and/or other suitable memory device or devices. The memory 42 is coupled to and/or in communication with the processor 40. The SCOT 20 further includes a scanner or scanning device 44 such as a laser-type scanner that is coupled to and/or in communication with the processor 40. A scale 46 is still further provided in the SCOT 20 that is coupled to and/or in communication with the processor 40. The SCOT 20 even further has a display 48 that is coupled to and/or in communication with the processor 40. The display 48 may be any type of device capable of providing video and/or visual images, pictures, both still and moving, including text to a user of the SCOT 20. As examples and without being limiting, the display 48 may be an LCD screen, a CRT, or the like.

The SCOT 20 further includes communications circuitry/logic 50 that is coupled to and/or in communication with the processor 50. A customer interface 52 is provided that is likewise coupled to and/or in communication with the processor 40. Additionally, the SCOT 20 includes a payment module or payment components 56 that is coupled to and/or in communication with the processor. The payment module 56 configured, adopted and/or operable to provide payment, receipt, change and/or the like functionality for the SCOT 20. It should be appreciated that the SCOT 20 may include other components that are not specifically mentioned and/or depicted herein that may allow the SCOT 20 to perform its functionality as well as provide additional functionality.

Storage 54 may also be provided in the SCOT 20. The storage 54 is configured, adapted and/or operable to store files such as option and/or configuration file or files in addition to or in place of storage 36 of the server 14 in accordance with an aspect of the subject invention. The storage 54 may also store program instructions for operation of the SCOT 20.

An item security characteristic data acquisition device 58 is also coupled to and/or in communication with the processor 40. The item security characteristic acquisition device 58 is configured, adopted and/or operable to obtain one or more non-weight characteristics and/or characteristic data of an item. Without being limiting, such item characteristic data includes weight, color, dimensions or the like. The item characteristic data is used for security and is stored in the item security database 24. Particularly, the item characteristic data is used to monitor, detect and/or verify that the item being scanned/purchased is the same item being bagged or taken from the store.

The item security characteristic data acquisition device 58 may be embodied or a single device capable of acquiring data regarding one or more item characteristics or multiple devices each capable of acquiring data regarding one or more item characteristics. Without being limiting, such device or devices may be a camera, a scale, sensor, or the like.

The memory 42 is configured, adapted and/or operable to at least temporarily store and/or allow retrieval of program instructions that control and/or regulate the operation of the various components of the SCOT 20, the SCOT 20 in general, and/or the request and/or retrieval of information/data from outside components such as the item security database 24 (see FIG. 1) and/or the custom bar code format file from the custom bar code format file that may be stored in the storage file 36 (see FIG. 1). The program instructions may be provided to the memory 42 via various manners such as the communications circuitry/logic 50, may be stored in the memory before or during assembly of the SCOT 20, or the storage 54 of the SCOT 20. The program instructions are executable by the processor 40 and/or any of the other SCOT components as appropriate. Typically, the program instructions are executed by the processor 40 that then controls and/or provides control of the various components and/or the information/data of the SCOT 20 and/or the system 12. Various aspects of the subject invention may be and/or are implemented via program instructions that manipulate information/data obtained by the various SCOT components and/or obtained from one or more of the databases 16. Particularly, and as described below in greater detail, the program instructions allow an obtained bar code to be defined or redefined, as the perspective may be, into a generic format.

Figure 3:
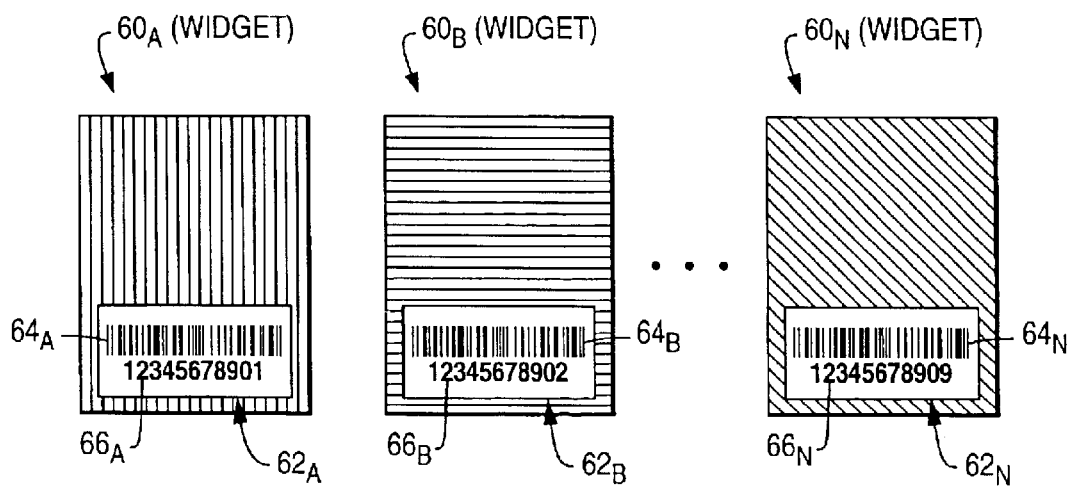
FIG. 3 is a depiction of an exemplary item that varies with respect to a non-weight characteristic, each item of which has a bar code that is essentially identical but which has a particular portion of which varies because of the non-weight characteristic.

Referring to FIG. 3, there is depicted a plurality of exemplary items, generally designated $60_A$, $60_B$, through $60_N$. The items $60_A$, $60_B$, through $60_N$ represent one and all types of items, products, merchandise and/or the like that are essentially the same but which are different or vary by one or more non-weight characteristics and which are obtained by the item security characteristic data acquisition device 58. For example and as represented by the items $60_A$, $60_B$, through $60_N$, each item $60_A$, $60_B$, through $60_N$ may differ by color, with color, of course, being a non-weight characteristic. Each item $60_A$, $60_B$, through $60_N$ is substantially similar, if not identical with respect to weight (i.e. each item $60_A$, $60_B$, through $60_N$ is the same item) except for the non-weight characteristic. Because there is a non-weight difference between the items $60_A$, $60_B$, through $60_N$, each item has a different and respective UPC $62_A$, $62_B$, through $62_N$ (or interchangeably, bar code $64_A$, $64_B$, through $64_N$). As explained further below, the difference in UPC $62_A$, $62_B$, through $62_N$ is typically only a few digits. These few digits are typically at the end of the UPC, as an additional or supplemental portion or suffix or may be part of a "main" UPC (one without a suffix).

The UPC $62_A$, $62_B$, through $62_N$ in this example, includes both a respective bar code UPC $64_A$, $64_B$, through $64_N$, and a respective numeric code $66_A$, $66_B$, through $66_N$. Each bar code $64_A$, $64_B$, through $64_N$ is preferably an industry-standard bar code, but may be another type of bar code and/or machine-readable indicia. The numeric code $66_A$, $66_B$, through $66_N$ is a numeric representation of the bar code $64_A$, $64_B$, through $64_N$ that is thus human-readable. If the bar code $64_A$, $64_B$, through $64_N$ would include letters, the numeric code $66_A$, $66_B$, through $66_N$ would contain letters and thus be an alphanumeric representation of the bar code $64_A$, $64_B$, through $64_N$. Similarly, if the bar code $64_A$, $64_B$, through $64_N$ would include all letters, the numeric code $66_A$, $66_B$, through $66_N$ would be an alphabetical representation of the bar code $64_A$, $64_B$, through $64_N$. Additionally, the bar code $64_A$, $64_B$, through $64_N$ and thus the numeric code $66_A$, $66_B$, through $66_N$ can contain symbols. Each UPC $62_A$, $62_B$, through $62_N$ and particularly the respective bar code $64_A$, $64_B$, through $64_N$ is readable by the scanner 44 as the respective items $60_A$, $60_B$, through $60_N$ is passed within range of the scanner 44. The obtained bar code $64_A$, $64_B$, through $64_N$ is processed by the processor 40 in the manner set forth herein.

Figure 4:
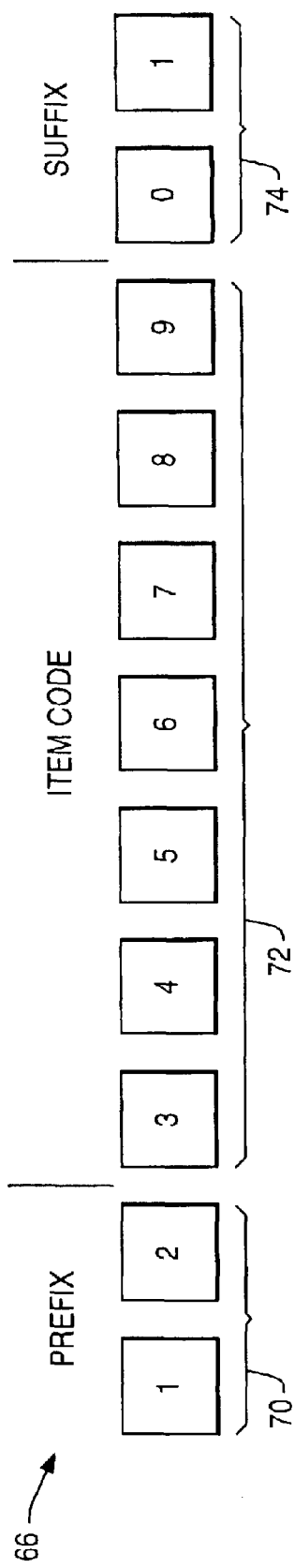
FIG. 4 is a depiction of a numeric code portion of a bar code showing various parts thereof in accordance with the principles of the subject invention.

Referring to FIG. 4, a numeric code portion 66 of the UPC 62 is shown in greater detail. While the bar code 64 of the UPC 62 is obtained by the scanner 44 and thereafter processed or manipulated, the numeric portion 66 directly corresponds in numbers to the bar code 64. Therefore, for sake of clarity, FIG. 4 and the below discussion utilizes the subject invention is discussed in terms of the numeric code portion 66 of the UPC 62/bar code 64. It should be appreciated, however, that unless otherwise indicated, the numeric code 68 and the bar code 66 may be considered as interchangeable, with the bar code 66 being machine-readable while the numeric code 68 is human-readable. Additionally the generic term UPC may apply to the bar code. The numeric code 66 has a given length of digits or positions. In FIG. 4, the total digits or positions are eleven (11). It should be appreciated, however, that the number of digits or positions is variable for bar codes. Regardless of the number of digits of the bar code 64, the principles of the subject invention are applicable.

The bar code 64 in general defines a particular item. Therefore, each different item has a different bar code 64. In some cases, the item is the same, but some characteristic of the item changes. For instance, as shown above, an item may come in a variety of colors. The basic bar code 64 for each item is the same. However, since the color is different, the bar code may have additional digits, numbers or positions, or have slightly different numbers to identify color (or other characteristic of the particular style, model or the like of the item, particularly such as a non-weight characteristic). While it may be necessary for inventory databases and price databases for the bar code to correlate to the exact bar code obtained by the scanner, the color of the item would not matter to the bar code in the item security database 24. If the exact obtained bar code would not exist in the item security database 24, a duplicate bar code entry would be generated. The subject invention allows the item security database 24 to store only one bar code entry for items that vary according to a non-weight characteristic either for retrieval of a characteristic (characteristic data) after scanning the item and/or for learning a characteristic (characteristic data) of an item after scanning (i.e. for adding an item characteristic entry and correlated bar code).

As depicted in FIG. 4, the numeric code 66 may be divided into three parts, namely a prefix or identifier portion 70, an item code portion 72, and a suffix or variable portion 74. In accordance with the principles of the subject invention the format of the bar code 66 may be defined in order to prevent duplication of bar code entries in the item security database 24. The subject invention allows for the system 12 to utilize a single item characteristic database bar code entry that is associated with a single item characteristic (e.g. weight) for a plurality of scanned bar codes associated with a plurality of items wherein the plurality of items are of the same type and differ in a non-weight characteristic, and thus obtain a single item characteristic for all of the items. The subject invention also allows for the system 12 to learn a single item characteristic applicable to a plurality of items each one of which has a different bar code, the items differing according to a non-weight characteristic.

Figure 5:
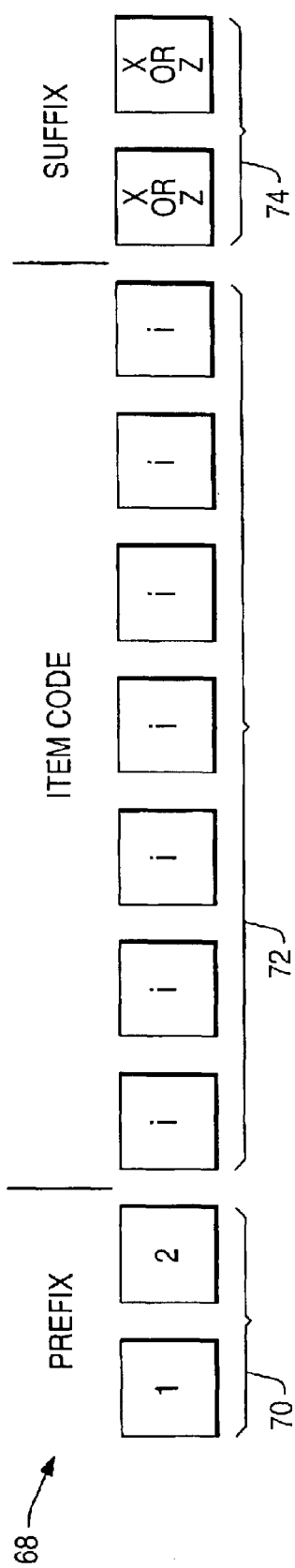
FIG. 5 is a depiction of a custom bar code format template in accordance with the principles of the subject invention.

Particularly, with reference to FIG. 5 an exemplary custom bar code format or custom bar code format template is shown, generally designated 68. The custom bar code format 68 may be defined in terms of the prefix 70, the item code 72, and the suffix 74 as was the bar code 66 of FIG. 4. It should be appreciated that the digit length of each portion 70, 72 and 74 is arbitrary. The custom bar code format 68 allows a plurality of obtained bar codes to be utilized as one bar code with respect to the item security database 24. Particularly, the custom bar code format 68 allows the manipulation of the obtained bar code so that the customized bar code according to the custom bar code format 68 is utilized to retrieve item characteristic data from the item security database 24 and/or learn (add) characteristic data of an item that varies in a non-weight characteristic.

The prefix 70 is defined by the custom bar code format 68 as the common prefix of the plurality of bar codes that equal the total number of items for which the particular custom bar code format 68 is to apply. For instance, if there are eight (8) items in the group (plurality of items) to which a single weight is applicable, the prefix common to these eight items is maintained. In this instance, the common prefix is two (2) digits in length and constitute the digits "1" and "2." The prefix 70 serves as an identifier for the items.

The item code 72 is defined by the custom bar code format 68 as those digits that are maintained or kept when performing bar code manipulation. Digits that are kept during bar code manipulation are represented by an "i." In this instance, the item code portion 72 is seven (7) digits in length.

The suffix 74 is defined by the custom bar code format 68 by a designation, here either "x" or "z", that indicates the function or manner in which the suffix is to be treated during bar code manipulation. In this example, the term "x" represents obtained bar code information that is to be removed, ignored or kept out when referencing the item security database 24, while the term "z" represents obtained bar code information that is to be zeroed out (turned into zeros) when referencing the item security database 24.

It should be appreciated that the custom bar code format 68 may have any combination of "i's", "z's" or "x's" in any location. The custom bar code format 68 provides a template for manipulating the bar code. This aids in prevention of duplicate bar code entries in the item security database 24.

The custom bar code format/format template file, configuration file or option file, database, look-up table and/or the like, is preferably maintained in the storage device 54 of the SCOT 20, the storage device 36 of the server 14, or other location accessible by the SCOT 20. The custom bar code format file is configured, adapted and/or operable to provide a custom or predefined format or template for bar codes of an item that varies with respect to a non-weight characteristic, or for a group of the same or substantially the same items that differ with respect to non-weight characteristics. The custom bar code format file allows a user (e.g. the store 10) to define the custom bar code format or format template. An obtained bar code may be manipulated according to the custom bar code format. This allows multiple bar codes to be processed as a single bar code. Particularly, this allows multiple bar codes to be read and processed as a single bar code for use with the item security database 24. Such a format file may be defined utilizing a graphical user interface (GUI) type program or the like.

Figure 6:
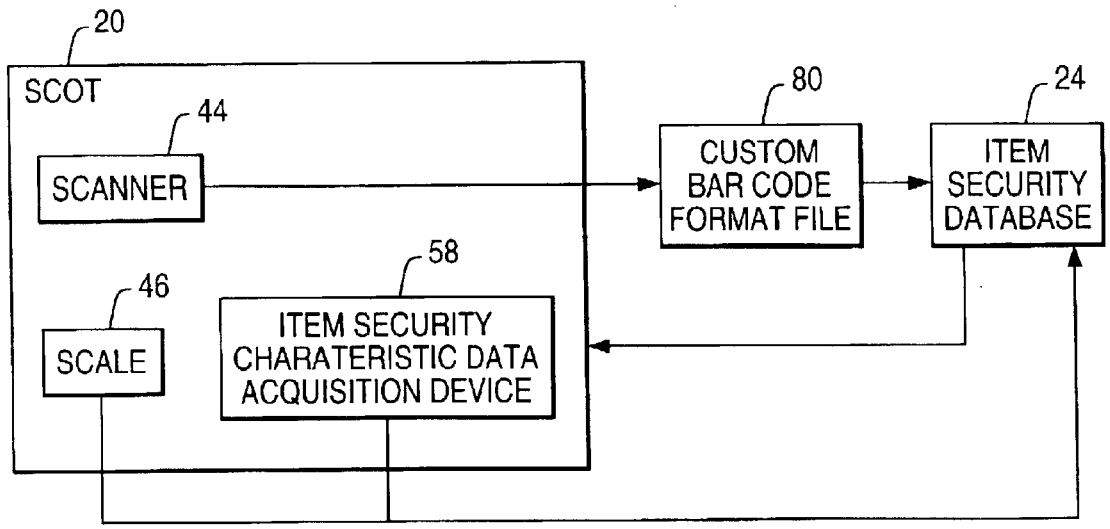
FIG. 6 is a block diagram of components of the subject system illustrating an exemplary manner of operation of the subject invention.

Referring to FIG. 6, a block diagram of components utilized in the subject invention particularly in accordance with an exemplary manner of operation is shown. Particularly, the scanner 44 of the SCOT 20 obtains a bar code from an item 60. The custom bar code format file 80 is consulted to determine if a custom bar code format 68 is to be used for the obtained bar code. If so, the obtained bar code is manipulated according to the custom bar code format 68 the manipulated bar code is then used to access the item security database 24. The item security database 24 provides item characteristic data according to the manipulated bar code to the SCOT 20 if the bar code and associated item characteristic/item characteristic data is in the item characteristic database 24. The scale 46 or item security characteristic data acquisition device 58 is used to verify the obtained item characteristic data with the characteristic data from the item security database 24. The scale 46 provides a weight (as the item characteristic data) to the item security database 24 in order for the item security database 24 to learn the weight of the item and create a new bar code entry with an associated weight or the item security characteristic data acquisition device 58 provides another type of item characteristic data to the item security database 24.

Figure 7:
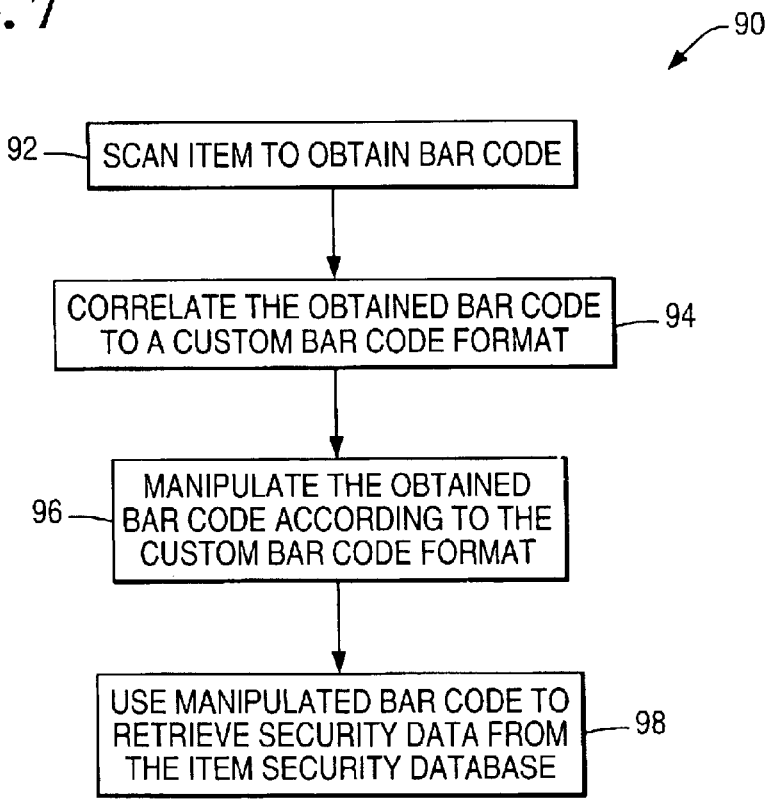
FIG. 7 is a flowchart of an exemplary manner of operation of one aspect of the subject invention.

Referring to FIG. 7, there is depicted a flowchart, generally designated 90, setting forth an exemplary manner of operation of the subject invention according to the present principles. Initially, in step 92, a checkout terminal scans an item to obtain its bar code. Particularly, the scanner of the checkout terminal is used to read and thus obtain the bar code. In step 94, the obtained bar code is correlated to a custom bar code format. Particularly, the custom bar code format file is accessed in order to correlate and/or manipulate the obtained bar code with a custom bar code format stored in the custom bar code format file. This is accomplished, in one exemplary form, by first comparing or matching the prefix of the obtained bar code with a prefix of a custom bar code format. Thereafter, it is determined if the total digital length of the obtained bar code equals the digit length of the custom bar code format. The total digit length of the obtained bar code is thus compared to the total digit length of the custom bar code format to find out if there is a direct match. When there is no direct match, the weight learning database may need to learn the weight if the exact bar code is not located in the weight learning database. If there is a direct match of the total digit length, the digits having an "i" of the custom bar code format 68 corresponding to the obtained bar code are kept as read by the scanner.

The suffix of the custom bar code format is then consulted. The codes correlating to the zero out or omit (omission) function is used to manipulate the suffix of the obtained bar code, step 96. Thus, manipulation of the obtained bar code is accomplished according to the coded custom bar code format. In step 98, once the obtained bar code has been manipulated, the manipulated bar code is used to consult the item security database 24. If a bar code entry in the item security database 24 matches the manipulated bar code, item characteristic data (e.g. weight) is obtained from the matching bar code in the item security database, else an item characteristic may be obtained for the item being scanned for the item security database.

The zeroing out function verses the omission function will now be discussed in accordance with the principle of the subject invention. With the zeroing out function, the digits of the obtained bar code indicated in the custom bar code format file as those needing zeroing out are changed to zeros. With the omission function, the digits of the obtained bar code indicated in the custom bar code format file as those needing to be omitted, are just omitted. Typically, the select digits (or characters) of the obtained bar code would be zeroed out if the obtained bar code were a "main" type of bar code/UPC (i.e. no supplemental information), but omitted if the obtained bar code were a supplemental type of bar code/UPC. This is because some scanners do not always return the supplemental portion of the bar code. Essentially, the subject invention aids in preventing duplicate bar code entries in databases for the same item with and without supplemental bar codes.

Figure 8:
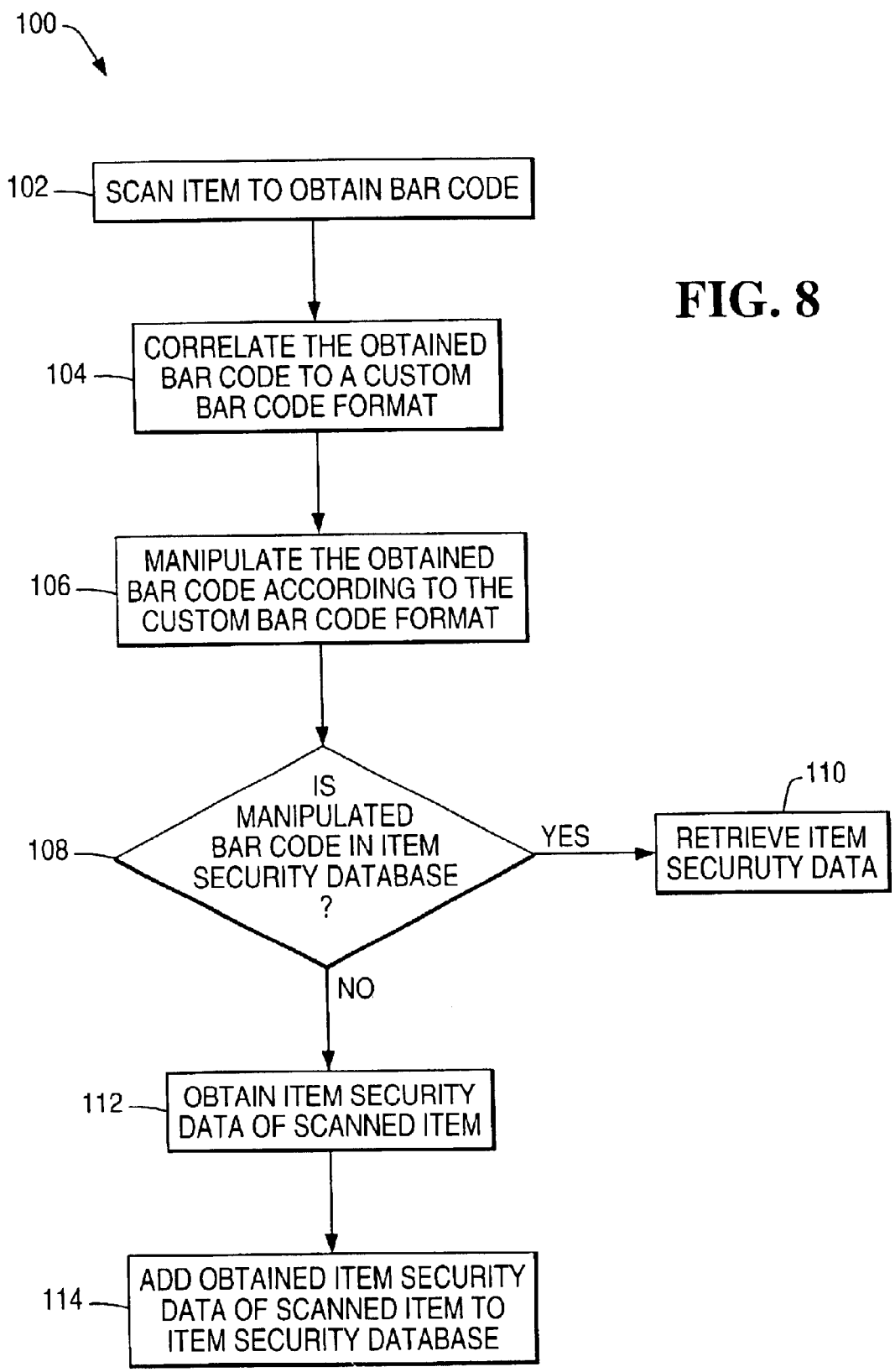
FIG. 8 is a flowchart of an exemplary manner of operation of another aspect of the subject invention.

Referring to FIG. 8, there is depicted a flowchart, generally designated 100, setting forth an exemplary manner of operation of the subject invention according to the present principles. Initially, in step 102, a checkout terminal scans an item to obtain its bar code. Particularly, the scanner of the checkout terminal is used to read and thus obtain the bar code. In step 104, the obtained bar code is correlated to a custom bar code format. Particularly, the custom bar code format file is accessed in order to correlate and/or manipulate the obtained bar code according to a custom bar code format stored in the custom bar code format file in a manner such as set forth above with respect to FIG. 7. In step 106, the obtained bar code is manipulated according to the custom bar code format in like manner to that set forth above with respect to FIG. 7.

In step 108 it is determined whether the manipulate bar code is in the item security database. If yes, then in step 110, the item characteristic data is retrieved. If yes, then in step 112 item characteristic data is obtained for the scanned item. Particularly, the scale 46 is used to obtain a weight for the scanned item (if weight is the item characteristic data) or the item security characteristic data acquisition device is used to obtain data regarding a selected item characteristic. Thereafter, in step 114, the obtained item characteristic data is then provided for storage in the item security database.

While this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

What is claimed is:

1. A method of retrieving security data for an item from an item security database comprising the steps of:

scanning an item to obtain a bar code data from a bar code associated with the item;

correlating the obtained bar code data to a custom bar code template stored in a custom bar code template file;

altering values of a portion of the obtained bar code data in accordance with the correlated custom bar code template to obtain value altered bar code data; and using the value altered bar code data to retrieve security data for the scanned item from an item security database.

2. The method of claim 1, further comprising the steps of:

defining a custom bar code template for a plurality of forms of like items differing with respect to a characteristic thereof; and storing the defined custom bar code template in a custom bar code template file.

3. The method of claim 2, wherein the step of defining a custom bar code template includes the steps of:

identifying the bar codes of each form of the plurality of like items;

determining a total digit length for the identified bar codes;

defining an identifier portion of the determined total digit length;

defining a fixed portion of the determined total digit length; and defining a variable portion of the determined total digit length.

4. The method of claim 3, wherein the step of correlating the obtained bar code data to a custom bar code template stored in a custom bar code template file includes the steps of:

determining if the defined identifier portion of the determined total digit length is equal to an equivalent identifier portion of the obtained bar code data;

determining if the defined fixed portion of the determined total digit length is equal to an equivalent fixed portion of the obtained bar code data; and determining if a total digit length of the obtained bar code data equals the total digit length of the identified bar codes.

5. The method of claim 3, wherein the step of defining a variable portion of the determined total digit length includes defining the variable portion of the determined total digit length as one of a zeroing out function and an omission function.

6. The method of claim 5, wherein the step of altering values of a portion of the obtained bar code data in accordance with the correlated custom bar code template to obtain value altered bar code data includes the steps of:

determining the function of the variable portion; and performing the determined function on the obtained value altered bar code data.

7. The method of claim 1, wherein the step of using the value altered bar code data to retrieve security data for the scanned item from an item security database includes the step of retrieving weight as the security item.

8. The method of claim 1, further including the steps of:

acquiring security characteristic data regarding the scanned item; and comparing the acquired security characteristic data regarding the scanned item with the retrieved security data for the scanned item from the item security database.

9. A checkout system comprising:

a checkout terminal;

a custom bar code template file in communication with said checkout terminal and containing a custom bar code template; and an item security database in communication with said checkout terminal and containing (i) a bar code entry for an item that varies with respect to a non-weight characteristic, and (ii) a security characteristic for the item corresponding to the bar code entry for that item;

the checkout terminal having:

a processor;

a scanner in communication with said processor;

an item security characteristic data acquisition device in communication with said processor; and memory in communication with said processor and containing processor-executable program instructions which, when executed by said processor, causes said checkout terminal to:

scan an item to obtain a bar code data associated with the item;

correlate the obtained bar code data to the custom bar code template in the custom bar code template file;

alter values of a portion of the obtained bar code data in accordance with the correlated custom bar code template; and use the value altered bar code data to retrieve security characteristic data for the item from the item security database by correlating the value altered bar code data with the bar code entry in the item security database.

10. The checkout system of claim 9, wherein the memory contains further program instructions which, when executed by said processor, causes said processor to:

define a custom bar code template for a plurality of forms of like items differing with respect to a non-weight characteristic thereof; and store the defined custom bar code template in the custom bar code template file.

11. The checkout system of claim 9, wherein said custom bar code template comprises:

a total digital length of identified bar codes of each form of the plurality of like items;

an identifier portion of the total digit length;

a fixed portion of the total digit length; and a variable portion of the total digit length.

12. The checkout system of claim 11, wherein the memory contains further program instructions which, when executed by said processor, causes said processor to:

determined if the defined identifier portion of the total digit length is equal to an equivalent identifier portion of the obtained bar code data;

determine if the defined fixed portion of the total digit length is equal to an equivalent fixed portion of the obtained bar code data; and determine if a total digit length of the obtained bar code data equals the total digit length of the identified bar codes.

13. The checkout system of claim 11, wherein the memory contains further program instructions which, when executed by said processor, causes said processor to define the variable portion of the total digit length of the bar code as one of a zeroing out function and an omission function.

14. The checkout system of claim 13, wherein the memory contains further program instructions which, when executed by said processor, causes said processor to:

determine the function of the variable portion; and perform the determined function on the variable portion on the obtained value altered bar code data.

15. The checkout system of claim 9, wherein the memory contains further program instructions which, when executed by said processor, causes said processor to:

use the value altered bar code data to retrieve weight as the security data for the scanned item from an item security database.

16. The checkout system of claim 9, wherein the memory contains further program instructions which, when executed by said processor, causes said processor to:

acquire security characteristic data regarding the scanned item; and compare the acquired security characteristic data regarding the scanned item with the retrieved security data for the scanned item from the item security database.

17. A method of preventing duplicate bar code entries in an item security database, comprising the steps of:

scanning an item to obtain a bar code data from a bar code associated with the item;

correlating the obtained bar code data to a custom bar code template stored in a custom bar code template file;

altering values of a portion of the obtained bar code data in accordance with the correlated custom bar code template to obtain value altered bar code data;

acquiring security characteristic data of the scanned item; and creating an altered bar code entry in an item security database correlated to the acquired security characteristic data of the scanned item.

18. The method of claim 17, further comprising the steps of:
defining a custom bar code template for a plurality of forms of like items differing with respect to; and
storing the defined custom bar code template in the custom bar code template file.

19. The method of claim 18, wherein the step of defining a custom bar code template includes the steps of:
identifying the bar codes of each form of the plurality of like items;
determining a total digit length for the identified bar codes;
defining an identifier portion of the determined total digit length;
defining a fixed portion of the determined total digit length; and
defining a variable portion of the determined total digit length.

20. The method of claim 19, wherein the step of correlating the obtained bar code data to a custom bar code template stored in a custom bar code template file includes the steps of:
determining if the defined identifier portion of the determined total digit length is equal to an equivalent identifier portion of the obtained bar code data;
determining if the defined fixed portion of the determined total digit length is equal to an equivalent fixed portion of the obtained bar code data; and
determining if a total digit length of the obtained bar code data equals the total digit length of the identified bar codes.

21. The method of claim 19, wherein the step of defining a variable portion of the determined total digit length includes defining the variable portion of the determined total digit length as one of a zeroing out function and an omission function.

22. The method of claim 21, wherein the step of altering values of a portion of the obtained bar code data in accordance with the correlated custom bar code template includes the steps of:
determining the function of the variable portion; and
performing the determined function on the obtained value altered bar code data.

* * * * *